United States Patent
Li et al.

(10) Patent No.: US 8,848,622 B2
(45) Date of Patent: Sep. 30, 2014

(54) METHODS AND APPARATUS FOR IMPROVING POWER EFFICIENCY AND LATENCY OF MOBILE DEVICES USING AN EXTERNAL TIMING SOURCE

(75) Inventors: Junyi Li, Chester, NJ (US); Saurabh Tavildar, Jersey City, NJ (US); Aleksandar Jovicic, Piscataway, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 12/507,567

(22) Filed: Jul. 22, 2009

(65) Prior Publication Data
US 2011/0019601 A1 Jan. 27, 2011

(51) Int. Cl.
| H04W 4/00 | (2009.01) |
| H04W 52/02 | (2009.01) |
| H04W 56/00 | (2009.01) |
| H04W 84/18 | (2009.01) |

(52) U.S. Cl.
CPC ...... *H04W 52/0229* (2013.01); *H04W 56/0015* (2013.01); *H04W 84/18* (2013.01); *Y02B 60/50* (2013.01)
USPC .......................................... 370/329; 370/338

(58) Field of Classification Search
CPC ........................... H04W 52/143; H04L 45/121
See application file for complete search history.

(56) References Cited

U.S. PATENT DOCUMENTS

| 7,027,773 B1 | 4/2006 | McMillin | |
| 2003/0026240 A1* | 2/2003 | Eyuboglu et al. ............. | 370/349 |
| 2004/0147272 A1 | 7/2004 | Shiota et al. | |
| 2007/0037610 A1 | 2/2007 | Logan | |
| 2007/0064742 A1 | 3/2007 | Shvodian | |
| 2007/0171910 A1* | 7/2007 | Kumar .......................... | 370/392 |
| 2007/0208841 A1* | 9/2007 | Barone et al. .................. | 709/223 |
| 2007/0238483 A1 | 10/2007 | Boireau et al. | |
| 2007/0270129 A1 | 11/2007 | Luo | |
| 2007/0286136 A1 | 12/2007 | Rittle et al. | |
| 2008/0049700 A1 | 2/2008 | Shah et al. | |
| 2008/0130618 A1 | 6/2008 | Kwon | |

(Continued)

FOREIGN PATENT DOCUMENTS

| EP | 1976165 A2 | 10/2008 |
| EP | 2139168 A1 | 12/2009 |

(Continued)

OTHER PUBLICATIONS

International Search Report and Written Opinion—PCT/US2010/042797, International Search Authority—European Patent Office—Oct. 18, 2010.

(Continued)

*Primary Examiner* — Brandon Renner
(74) *Attorney, Agent, or Firm* — Joseph B. Agusta (57) ABSTRACT

Methods and apparatus for increasing power efficiency and decreasing latency of communication of a mobile device operating in an unlicensed spectrum using global timing data are disclosed. The method includes receiving, at the mobile device, the global timing data from an external timing source, the mobile device communicating in the unlicensed spectrum, obtaining, at the mobile device, a time from the global timing data, and determining, at the mobile device, a wake time to switch the mobile device from a sleep state to an active state based on the time obtained from the global timing data.

28 Claims, 5 Drawing Sheets

(56) References Cited

U.S. PATENT DOCUMENTS

| | | |
|---|---|---|
| 2008/0165761 A1 | 7/2008 | Goppner et al. |
| 2008/0181154 A1 | 7/2008 | Sherman |
| 2008/0247344 A1* | 10/2008 | Bahl et al. ............ 370/310 |
| 2009/0010179 A1 | 1/2009 | Laroia et al. |
| 2009/0135751 A1 | 5/2009 | Hodges et al. |
| 2009/0279466 A1 | 11/2009 | Ji et al. |
| 2009/0305732 A1 | 12/2009 | Marcellino et al. |
| 2010/0019887 A1 | 1/2010 | Bridgelall et al. |
| 2010/0172275 A1 | 7/2010 | Wu et al. |
| 2010/0177708 A1* | 7/2010 | Pandey et al. ............ 370/329 |
| 2010/0277286 A1 | 11/2010 | Burkart et al. |
| 2010/0329230 A1 | 12/2010 | Yang et al. |
| 2011/0111700 A1 | 5/2011 | Hackett |
| 2011/0125405 A1 | 5/2011 | Blesener et al. |
| 2011/0170465 A1 | 7/2011 | Tavildar et al. |
| 2012/0002551 A1 | 1/2012 | Lampe et al. |
| 2012/0307698 A1 | 12/2012 | Tavildar et al. |
| 2013/0016641 A1 | 1/2013 | Twitchell, Jr. |

FOREIGN PATENT DOCUMENTS

| | | |
|---|---|---|
| JP | 2008283673 A | 11/2008 |
| JP | 2010011457 A | 1/2010 |
| WO | 2006056174 A1 | 6/2006 |
| WO | 2006067271 A1 | 6/2006 |

OTHER PUBLICATIONS

Taiwan Search Report—TW099124210—TIPO—Mar. 9, 2013.

* cited by examiner

METHODS AND APPARATUS FOR IMPROVING POWER EFFICIENCY AND LATENCY OF MOBILE DEVICES USING AN EXTERNAL TIMING SOURCE

BACKGROUND

1. Field

The invention relates to wireless communications. More particularly, the invention relates to methods and apparatus for improving power efficiency and latency of mobile devices using an external timing source.

2. Background

Wireless communications continues to grow in demand and has become an integral part of both personal and business communications. Wireless communications allow users to transmit and receive data from most anywhere using wireless networks and mobile devices such as laptops, cellular devices, iPhones, BlackBerrys, etc.

Wireless fidelity (WiFi) describes the wireless networks that adhere to the specifications developed by the Institute of Electrical and Electronic Engineers (IEEE) for wireless local area networks (LAN). WiFi devices are certified to be interoperable with other certified WiFi devices using the 802.11 standard of the IEEE. These WiFi devices allow over-the-air interfaces in order to create a wireless network for facilitating data transfer.

In some instances, the data transfer can be facilitated by running WiFi applications (e.g., exchange peer discovery information, exchange traffic routing information, connection setup requests, and traffic monitoring) on the mobiles devices. For example, the WiFi applications can be run on the mobile devices when the mobile devices are in a passive mode; however, WiFi applications consume large amounts of current, thus impacting the standby time of the mobile devices and even making it infeasible to run certain WiFi applications on the mobile devices. Some power saving features are currently available on mobile devices, however, most are inefficient at running these WiFi applications.

In addition, the asynchronous nature of WiFi further impacts the latency and the power efficiency of mobile devices. That is, transmissions and receptions using WiFi are not synchronized but rather are performed in an asynchronous manner. For example, a WiFi transmitter may try to communicate with a WiFi receiver at a random time and if the WiFi receiver is not ready to communicate at the random time or is surrounded by other WiFi transmitters trying to communicate with the WiFi receiver, the WiFi receiver is unable to receive the data correctly in which case the WiFi transmitter may decide to back-off and transmit at a later time (e.g., 10 milliseconds later). This example illustrates the inherent latencies in WiFi communications. Furthermore, power inefficiencies are also increased for the WiFi transmitter and the WiFi receiver.

Therefore, it has been recognized by those skilled in the art that a need exists for methods and apparatus for improving power efficiency and latency of mobile devices.

SUMMARY

Methods and apparatus for increasing power efficiency and decreasing latency of communication of a mobile device operating in an unlicensed spectrum using global timing data are disclosed. The method includes receiving, at the mobile device, the global timing data from an external timing source, the mobile device communicating in the unlicensed spectrum, obtaining, at the mobile device, a time from the global timing data, and determining, at the mobile device, a wake time to switch the mobile device from a sleep state to an active state based on the time obtained from the global timing data. In addition, the method may include receiving, at the mobile device during the active state, signals from other devices communicating in the unlicensed spectrum and determining, at the mobile device, a sleep time occurring after the wake time to switch the mobile device from the active state to the sleep state based on the signals received during the active state from the other devices communicating in the unlicensed spectrum. Furthermore, the method may include decoding the signals received during the active state from the other devices communicating in the unlicensed spectrum. The determining a sleep time occurring after the wake time to switch the mobile device from the active state to the sleep state may comprise at least one of matching information in the decoded signals with a stored list of peer devices or determining whether a traffic request signal was received at the mobile device or sent from the mobile device.

An apparatus for increasing power efficiency and decreasing latency of communication and configured to operate in an unlicensed spectrum. The apparatus includes a processor configured to receive the global timing data from an external timing source, obtain a time from the global timing data, and determine a wake time to switch the mobile device from a sleep state to an active state based on the time obtained from the global timing data.

The processor is further configured to receive, during the active state, signals from other devices communicating in the unlicensed spectrum and determine a sleep time occurring after the wake time to switch from the active state to the sleep state based on the signals received during the active state from the other devices communicating in the unlicensed spectrum. The processor is further configured to decode the signals received during the active state from the other devices communicating in the unlicensed spectrum. To determine a sleep time occurring after the wake time to switch from the active state to the sleep state comprises at least one of to match information in the decoded signals with a stored list of peer devices or to determine whether a traffic request signal was received at the processor or sent from the processor. The processor is further configured to transmit information in the unlicensed spectrum during the active state. The processor is further configured to update an internal clock to be synchronized with the time obtained from the global timing data.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
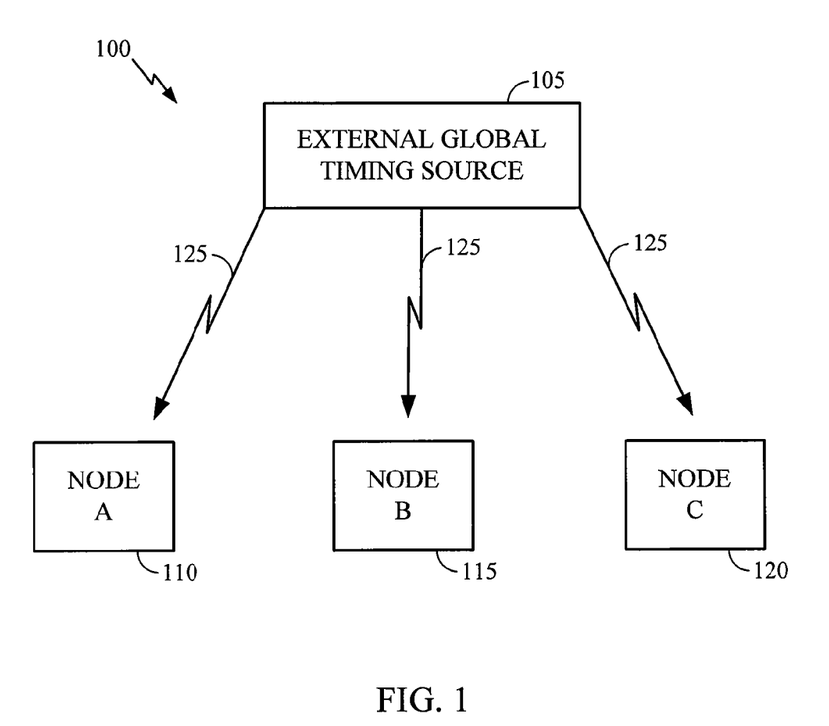
FIG. 1 is a simplified block diagram of a network having an external global timing source and a plurality of nodes configured to receive timing data from the external global timing source in accordance with various embodiments.

FIG. 1 is a simplified block diagram of a network 100 having an external global timing source 105 and a plurality of nodes 110, 115, 120 configured to receive timing data 125 from the external global timing source 105 in accordance with various embodiments. In various embodiments, the network 100 can be a WiFi network, an unlicensed network (i.e., a network operating in the unlicensed spectrum) and/or a carrier sense multiple access with collision avoidance (CSMA/CA) network and each of the plurality of nodes 110, 115, 120 can be a WiFi device or node, an unlicensed device (i.e., a device operating in the unlicensed spectrum), an unlicensed user, or a white-space device (WSD). A WSD can be a mobile device, a laptop computer or other portable device operating in open or unused frequencies. Currently, the unlicensed spectrum used for WiFi networks has been 2.4 GHz and 5.2/5.3 GHz. However, the unlicensed spectrum can include other frequencies and frequency ranges. For illustrative purposes, the disclosure will discuss WiFi networks; however, other types of unlicensed networks are within the scope of the invention. Furthermore, even though three nodes 110, 115, 120 are shown in FIG. 1, the network 100 can include one or more nodes.

Figure 4:
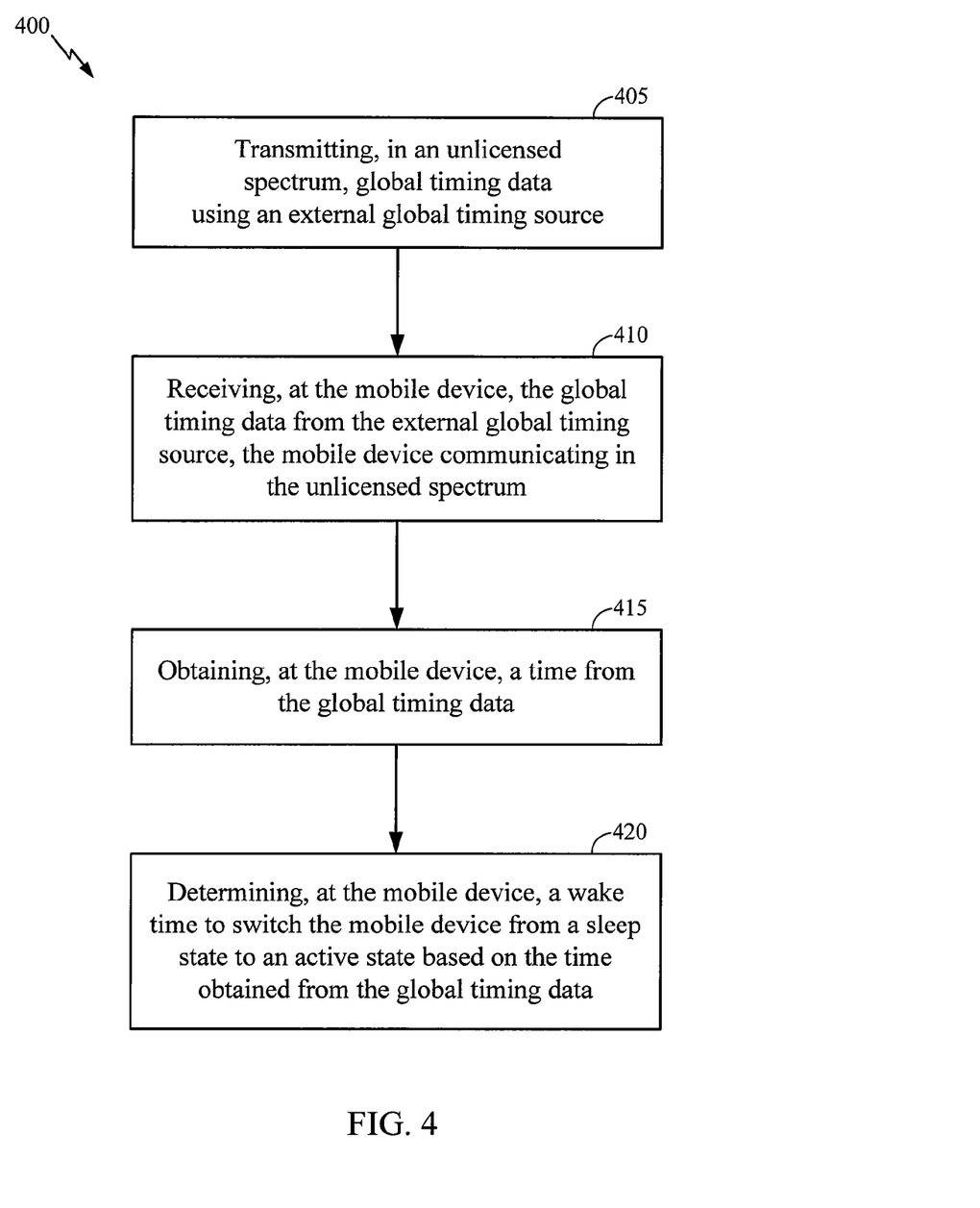
FIG. 4 is a flow diagram illustrating a method of increasing power efficiency and decreasing latency of communication of a mobile device operating in an unlicensed spectrum using timing data (e.g., a global timing signal) in accordance with various embodiments.

The network 100 can be operated using the timing data 125 from the external global timing source 105. For example, the external global timing source 105 can broadcast (i.e., transmit), via the unlicensed spectrum, the timing data 125 to the plurality of nodes 110, 115, 120 (block 405). The timing data 125 can be an external synchronous timing signal or timing information that is transmitted to each of the plurality of nodes 110, 115, 120 via the unlicensed spectrum. In an embodiment, the external global timing source 105 can broadcast (i.e., transmit) the timing data 125 to the plurality of nodes 110, 115, 120 using an out-of-band signal. The term "external" means remote and not part of the receiving device (i.e., a node or a mobile device). Examples of the timing data 125 include a global positioning system (GPS) signal, a long range aid to navigation (LORAN) signal, a code division multiple access (CDMA) 2K signal, a synchronous wide area network (WAN) signal, a digital television (DTV) signal, a digital video broadcasting (DVB) signal, and a WWVB signal. Each of these signals can be digital data or a waveform including a current GPS time value or an absolute time value.

The external global timing source 105 may include one or more of the following components: a base station, a tower, a transmitter (e.g., a GPS transmitter) coupled to the tower, an antenna coupled to the tower, a processor coupled to the transmitter, a DTV device, a DVB device, a WWVB device, a node or any other device capable of generating or producing timing data 125. The external global timing source 105 provides accurate timing data 125 within less than 2 microseconds of error.

Figure 2:
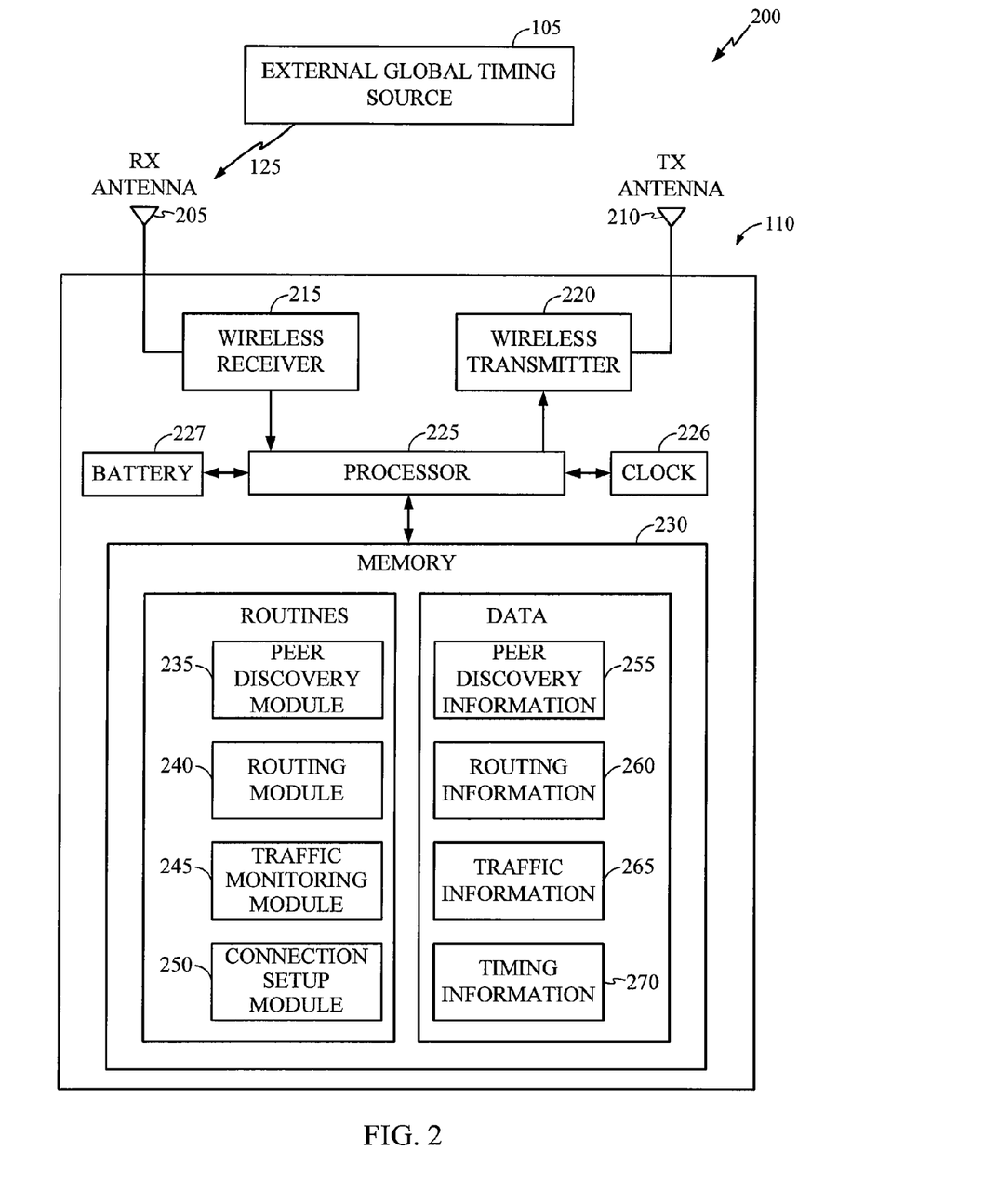
FIG. 2 is a block diagram of a network having the external global timing source and a single WiFi device configured to receive the timing data from the external global timing source in accordance with various embodiments.

FIG. 2 is a block diagram of a network 200 having the external global timing source 105 and a single WiFi device 110 (for illustrative purposes) configured to receive the timing data 125 from the external global timing source 105 in accordance with various embodiments (block 410). The WiFi device 110 may include a receive or reception (RX) antenna 205 coupled to a wireless receiver 215, a transmit or transmission (TX) antenna 210 coupled to a wireless transmitter 220, a processor 225, and a memory 230.

The processor 225 may be implemented using hardware, software, firmware, middleware, microcode, or any combination thereof. The processor 225 may be an Advanced RISC Machine (ARM), a controller, a digital signal processor (DSP), a microprocessor, an encoder, a decoder, or any other device capable of processing data, and combinations thereof. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The memory 230 may include or store various routines and data. As an example, the memory 230 may include modules such as a peer discovery module 235, a routing module 240, a traffic monitoring module 245, and a connection setup module 250. These modules may include machine readable instructions stored in the memory 230, the machine readable instructions being executed by the processor 225 to cause the processor 225 to perform various functions as described in this disclosure. The memory 230 may also store data such as peer discovery information 255, routing information 260, traffic information 265, and timing information 270. The WiFi device 110 includes a battery 227 for supplying power to the components or modules shown in FIG. 2.

The wireless receiver 215 receives the timing data 125 via the RX antenna 205 and transfers the timing data 125 to the processor 225. The processor 225 may decode the timing data 125 and extract the absolute time value from the timing data 125 for setting or synchronizing the current time of a clock 226 on the WiFi device 110 (block 415). The timing data 125 can be used to set or synchronize the current time on each of the plurality of nodes 110, 115, 120. The timing data 125 is received by the processor 225 several times (e.g., at least 5 times) per second and the clock 226 is updated several times per second to maintain accurate timing and synchronization of the nodes 110, 115, 120 (e.g., WiFi devices).

Figure 3:
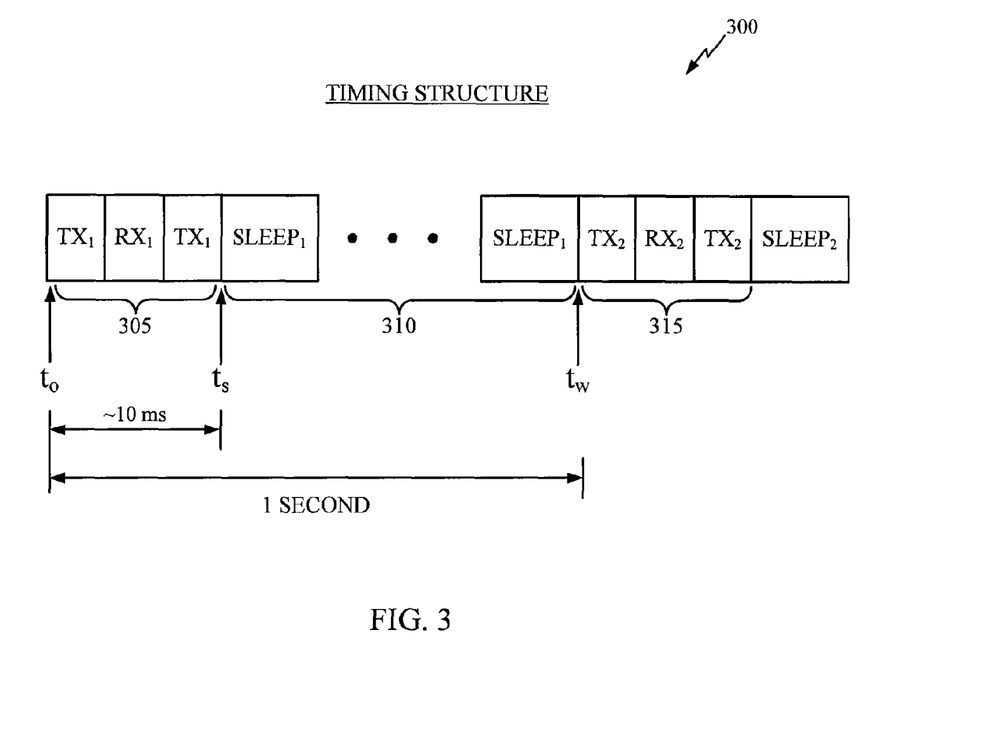
FIG. 3 is a timing structure that is part of a protocol (e.g., WiFi protocol) of the network and is stored in the memory of each node in accordance with various embodiments.

FIG. 3 is a timing structure 300 that is part of a protocol (e.g., a WiFi protocol) of the network 100 and is stored in the memory 230 of each node in accordance with various embodiments. Each node looks up or retrieves the timing structure 300 from its memory 230 to determine when the node is to transmit and receive data. Also, the timing structure 300 determines when each node is to be in an active mode or state 305 (i.e., transmitting data, receiving data or actively waiting to receive or transmit data) and when each node is to be in a sleep mode or state 310 (i.e., not transmitting data, not receiving data or not actively waiting to receive or transmit data). The timing structure 300 may repeat itself after a predetermined time (e.g., every 1 second).

The beginning of each timing structure 300 is denoted by a start time t0, the beginning of the sleep state 310 is denoted by a sleep time $t_s$, and the beginning of the wake state 315 is denoted by a wake time $t_w$. The start time $t_0$ for all timing structures 300 is set by, derived from or based on the timing data 125 (e.g., an absolute time value) from the external global timing source 105. The timing data 125 is used to synchronize the clock 226 of each node so that each node knows to begin or repeat the timing structure 300 at the same or approximately the same time. Setting the same or approximately the same start time $t_0$ for each node 110, 115, 120 in the network 100 to begin or repeat the timing structure 300 allows each node to know when to transmit data, listen for data, and be in the sleep state. As an example, the timing structure 300 allows the mobiles devices to determine a wake time $t_w$ to switch the mobile devices from a sleep state 310 to an active state 315 based on the timing data 125 obtained or received from the global timing source 105 (block 420).

An example of wireless communications in the unlicensed spectrum may help illustrate some of the advantages of the invention (e.g., increasing power efficiency and decreasing latency of the mobile devices). Nodes A and B have stored the timing structure 300 in their respective memory 230. When nodes A and B join the network 100, each node chooses an available slot in time and/or frequency from the network 100. Node A may transmit its peer discovery information during the $TX_1$ and $RX_2$ slots and node B may transmit its peer discovery information during the $RX_1$ and $TX_2$ slots. For example, node A transmits its peer discovery information during the $TX_1$ and $RX_2$ slots while node B listens or receives node A's peer discovery information. Then node B transmits its peer discovery information during $RX_1$ and $TX_2$ slots during which node A listens or receives node B's peer discovery information. This process allows nodes A and B to discover the presence of one another.

Prior to, during, and after the discovery process, nodes A and B may continuously receive the timing data 125 to synchronize their clock 226. Furthermore, during the second TX1 slot, node A could send a signal or packet to node B after discovering node B to indicate that it wants to set up a traffic connection with node B. In this case, node B would remain in the active state and wait for further packet transmission to start. If node B is unable to detect either node A's peer discovery signal or node A's traffic request signal, node B can then decide to go back to the sleep state.

Nodes A and B use the timing structure (or frame) 300 stored in the memory 230 to determine whether to be in the active state 305 or move into the sleep state 310. Nodes A and B are synchronized using the timing data 125 so that communications between nodes A and B are performed in an efficient manner. While communications is taking place, nodes A and B remain in the active state 305. Also, during the active state 305 or the sleep state 310, each node can perform certain tasks or execute certain applications such as exchange peer discovery information, exchange traffic routing information, connection setup requests, and traffic monitoring.

Node A and/or node B transfers back to the sleep state 310 after a predetermined amount of time when the node does not receive any signals during at least a portion (e.g., 10 milliseconds) of the active state 305, or when the node determines that there are no transmitted peer discovery signals of interest to it during at least a portion of the active state 305, or when the node determines that there are no transmitted traffic request signals of interest to it during at least a portion of the active state 305. Once in the sleep state 310, the nodes A and B wake up at the wake time $t_w$, which is predetermined by the timing structure 300 so that nodes A and B are both moved from the sleep state 310 to the active state 315 at the same time or approximately the same time. Increased power efficiencies are achieved by allowing all the nodes A and B to be in the sleep state 310 until the wake time $t_w$, at which time all the nodes A and B are moved from the sleep state 310 to the active state 315. Allowing the mobile devices to be in the sleep state 310 for longer periods of time conserves the stored energy or power of the battery 127 and allows longer operating and standby times for the mobile devices.

FIG. 4 is a flow diagram illustrating a method 400 of increasing power efficiency and decreasing latency of communication of a mobile device 110 operating in an unlicensed spectrum using timing data (e.g., a global timing signal). The external global timing source 105 transmits in the unlicensed spectrum, the timing data 125 to the mobile device 110 (block 405). The mobile device 110 receives the timing data 125 from the external global timing source 105 and is communicating in the unlicensed spectrum (block 410). The mobile device 110 extracts or obtains a time from the timing data 125 for setting or synchronizing the current time of a clock 226 on the mobile device 110 (block 415). The timing structure 300 allows the mobiles device 110 to determine a wake time $t_w$ to switch the mobile device 110 from a sleep state 310 to an active state 315 based on the time obtained or received from the timing data 125 (block 420).

Figure 5:
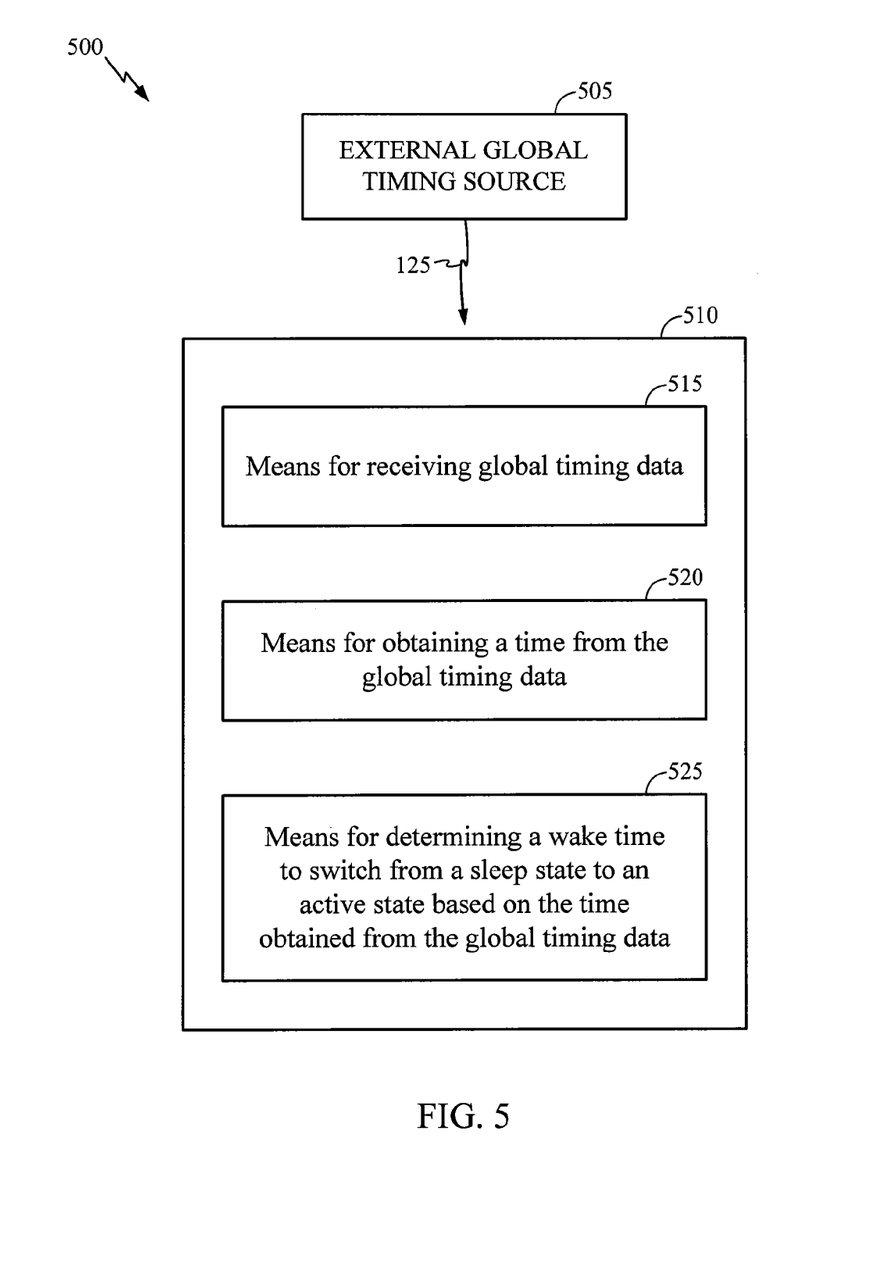
FIG. 5 is a block diagram illustrating exemplary components for an apparatus and the means for apparatus for increasing power efficiency and decreasing latency of communication of a mobile device operating in an unlicensed spectrum using timing data in accordance with various embodiments.

FIG. 5 is a block diagram illustrating exemplary components for an apparatus 500 and the means for apparatus 500 for increasing power efficiency and decreasing latency of communication of a mobile device 510 operating in an unlicensed spectrum using timing data 125 in accordance with various embodiments. The apparatus may include a module 515 for receiving global timing data from an external global timing source 505, a module 520 for obtaining a time from the global timing data, and a module 525 for determining a wake time to switch from a sleep state to an active state based on the time obtained from the global timing data.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

The invention claimed is:

1. A method of increasing power efficiency and decreasing latency of communication of a mobile device operating in an unlicensed spectrum, the method comprising:
   receiving, at the mobile device, global timing data several times a second, said global timing data including an absolute time value received several times per second via said unlicensed spectrum from an external timing source, the mobile device communicating in the unlicensed spectrum;
   obtaining, at the mobile device at a rate of several times per second, a current time from the absolute time value included in the global timing data;
   determining, at the mobile device, a wake time to switch the mobile device from a sleep state to an active state based on a time determined from the global timing data;
   receiving, at the mobile device during the active state, signals from other devices communicating in the unlicensed spectrum;
   decoding the signals received during the active state from the other devices communicating in the unlicensed spectrum;
   determining, at the mobile device, a sleep time occurring after the wake time to switch the mobile device from the active state to the sleep state based on the signals received during the active state from the other devices communicating in the unlicensed spectrum or the passage of a predetermined amount of time during the active state during which the mobile node does not receive any signals;
   wherein determining the sleep time occurring after the wake time to switch the mobile device from the active state to the sleep state includes: matching information in the decoded signals with a stored list of peer devices and determining that the sleep time is to begin when the mobile device determines that none of the transmitted peer discovery signals which were received are of interest to the mobile device or the mobile device does not receive any signals for said predetermined amount of time during the active state.

2. The method of claim 1, wherein said unlicensed frequency band is a WiFi frequency band; and
   wherein the method further comprises transmitting information in the unlicensed spectrum during the active state.

3. The method of claim 2 wherein the information is selected from a group consisting of peer discovery information, routing information, timing information, traffic information, and combinations thereof.

4. The method of claim 1 further comprising updating an internal clock on the mobile device to be synchronized with the time obtained from the global timing data.

5. The method of claim 1 wherein the sleep state is when the mobile device is not transmitting or receiving information.

6. The method of claim 1 wherein the active state is when the mobile device is transmitting or receiving information.

7. The method of claim 1, wherein determining the sleep time occurring after the wake time to switch the mobile device from the active state to the sleep state comprises determining that the sleep time is to begin when the mobile device does not receive any signals for said predetermined amount of time during the active state.

8. The method of claim 7, wherein said predetermined amount of time is a 10 millisecond time period.

9. The method of claim 2, wherein receiving, at the mobile device, global timing data includes receiving the absolute time value at least 5 times per second, the method further comprising:
   updating a clock of said mobile device multiple times per second based on the received global timing data; and
   wherein said step of determining, at the mobile device, a wake time to switch the mobile device from a sleep state to an active state is based on a timing structure that repeats at a rate which is less than a rate at which the absolute time value is received by the mobile device.

10. The method of claim 8, wherein said mobile device is a white space device.

11. An apparatus for increasing power efficiency and decreasing latency of communication and configured to operate in an unlicensed spectrum, the apparatus comprising:
   a processor configured to:
   receive global timing data several times a second, said global timing data including an absolute time value received several times per second via said unlicensed spectrum from an external timing source;
   obtain, at a rate of several times per second, a current time from the absolute time value included in the global timing data;
   determine a wake time to switch from a sleep state to an active state based on a time determined from the global timing data;
   receive, during the active state, signals from other devices communicating in the unlicensed spectrum;

decode the signals received during the active state from the other devices communicating in the unlicensed spectrum;

determining, at the mobile device, a sleep time occurring after the wake time to switch the mobile device from the active state to the sleep state based on the signals received during the active state from the other devices communicating in the unlicensed spectrum or the passage of a predetermined amount of time during the active state during which the mobile node does not receive any signals;

wherein to determine the sleep time occurring after the wake time to switch from the active state to the sleep state the processor is further configured to: match information in the decoded signals with a stored list of peer devices and to determine that the sleep time is to begin when the mobile device determines that none of the transmitted peer discovery signals which were received are of interest to the mobile device or the mobile device does not receive any signals for said predetermined amount of time during the active state.

12. The apparatus of claim 11, wherein said unlicensed frequency band is a WiFi frequency band; and wherein the processor is further configured to transmit information in the unlicensed spectrum during the active state.

13. The apparatus of claim 12 wherein the information is selected from a group consisting of peer discovery information, routing information, timing information, traffic information, and combinations thereof.

14. The apparatus of claim 11 wherein the processor is further configured to update an internal clock to be synchronized with the time obtained from the global timing data.

15. The apparatus of claim 11 wherein the sleep state is when the processor is not transmitting or receiving information.

16. The apparatus of claim 11 wherein the active state is when the processor is transmitting or receiving information.

17. The apparatus of claim 11, wherein said processor is further configured to determine that the sleep time is to begin when the mobile device does not receive any signals for said predetermined amount of time during the active state.

18. The apparatus of claim 12, wherein said processor is further configured to receive the absolute time value at least 5 times per second, as part of receiving the global timing data; and wherein said processor is further configured to update a clock of said mobile device multiple times per second based on the received global timing data; and wherein the processor is further configured to use a timing structure that repeats at a rate which is less than a rate at which the absolute time value is received by the mobile device when determining the sleep time occurring after the wake time.

19. The apparatus of claim 18, wherein said mobile device is a white space device.

20. A non-transitory machine readable medium embodying machine executable instructions to implement a method of increasing power efficiency and decreasing latency of communication of a mobile device operating in an unlicensed spectrum, the method comprising:

receiving, at the mobile device, global timing data several times a second, said global timing data including an absolute time value received several times per second via said unlicensed spectrum from an external timing source, the mobile device communicating in the unlicensed spectrum;

obtaining, at the mobile device at a rate of several times per second, a current time from the absolute time value included in the global timing data;

determining, at the mobile device, a wake time to switch the mobile device from a sleep state to an active state based on a time determined from the global timing data;

receiving, at the mobile device during the active state, signals from other devices communicating in the unlicensed spectrum;

decoding the signals received during the active state from the other devices communicating in the unlicensed spectrum;

determining, at the mobile device, a sleep time occurring after the wake time to switch the mobile device from the active state to the sleep state based on the signals received during the active state from the other devices communicating in the unlicensed spectrum or the passage of a predetermined amount of time during the active state during which the mobile node does not receive any signals;

wherein the instructions for determining the sleep time occurring after the wake time to switch the mobile device from the active state to the sleep state comprise instructions for matching information in the decoded signals with a stored list of peer devices and determining that the sleep time is to begin when the mobile device determines that none of the transmitted peer discovery signals which were received are of interest to the mobile device or the mobile device does not receive any signals for said predetermined amount of time during the active state.

21. The non-transitory machine readable medium of claim 20, wherein said unlicensed frequency band is a WiFi frequency band; and wherein the non-transitory machine readable medium further comprises instructions for transmitting information in the unlicensed spectrum during the active state.

22. The non-transitory machine readable medium of claim 21 wherein the information is selected from a group consisting of peer discovery information, routing information, timing information, traffic information, and combinations thereof.

23. The non-transitory machine readable medium of claim 20 further comprising instructions for updating an internal clock on the mobile device to be synchronized with the time obtained from the global timing data.

24. The non-transitory machine readable medium of claim 20 wherein the sleep state is when the mobile device is not transmitting or receiving information.

25. The non-transitory machine readable medium of claim 20 wherein the active state is when the mobile device is transmitting or receiving information.

26. The non-transitory machine readable medium of claim 20, wherein determining the sleep time occurring after the wake time to switch the mobile device from the active state to the sleep state comprises determining that the sleep time is to begin when the mobile device does not receive any signals for said predetermined amount of time during the active state.

27. The non-transitory machine readable medium of claim 21, wherein receiving, at the mobile device, global timing data includes receiving the absolute time value at least 5 times per second; and wherein the non-transitory machine readable medium further comprises instructions for updating a clock of said mobile device multiple times per second based on the received global timing data; and wherein said instructions for of determining a wake time to switch the mobile device from a sleep state to an active state use a timing structure that repeats at a rate which is less than a rate at which the absolute time value is received by the mobile device.

28. The non-transitory machine readable medium of claim 27, wherein said mobile device is a white space device.

* * * * *